United States Patent [19]
Kuhn et al.

[11] Patent Number: 5,445,181
[45] Date of Patent: Aug. 29, 1995

[54] MIXING VALVE

[75] Inventors: Weldon R. Kuhn, Elkhart Lake, Wis.; Dana F. Buccicone, Crystal Lake, Ill.

[73] Assignee: Kohler Co., Kohler, Wis.

[21] Appl. No.: 306,352

[22] Filed: Sep. 15, 1994

[51] Int. Cl.⁶ .................... F16K 11/074; G05D 23/13
[52] U.S. Cl. ........................................ 137/98; 251/85; 251/86
[58] Field of Search .............. 137/98, 100; 251/85, 251/86

[56] References Cited

U.S. PATENT DOCUMENTS

| | | | |
|---|---|---|---|
| 2,925,987 | 2/1960 | Priesmeyer | 251/85 X |
| 3,023,769 | 3/1962 | Williams | 137/329 |
| 3,023,784 | 3/1962 | Monson | 137/625 |
| 3,469,595 | 9/1969 | Petursson | 137/100 |
| 3,674,048 | 7/1972 | Manoogian et al. | 137/270 |
| 3,688,790 | 9/1972 | Esten | 137/98 |
| 3,724,480 | 4/1973 | Povalski et al. | 137/98 |
| 3,915,195 | 10/1975 | Manoogian et al. | 137/625 |
| 3,921,659 | 11/1975 | Rudewick et al. | 137/98 |
| 4,095,610 | 6/1978 | Priesmeyer | 137/100 |
| 4,397,330 | 8/1983 | Hayman | 137/270 |
| 4,408,745 | 10/1983 | Swiers | 251/86 X |
| 4,901,750 | 2/1990 | Nicklas et al. | 137/270 |

OTHER PUBLICATIONS

A one page Price Pfister ad entitled "Bodyguard© Pressure Balanced Shower or Tub Set", undated, admitted prior art.

*Primary Examiner*—Robert G. Nilson
*Attorney, Agent, or Firm*—Quarles & Brady

[57] ABSTRACT

There is disclosed a pressure-compensated mixing valve of the diaphragm and reciprocating piston type, wherein a flexible connection between the diaphragm and the pistons is provided. This flexible connection affords a self-alignment of the pistons in water inlet passages. In a preferred manner, this is used with a mixing valve providing alignment of a ported ring member that also provides in part an internal stop feature.

5 Claims, 5 Drawing Sheets

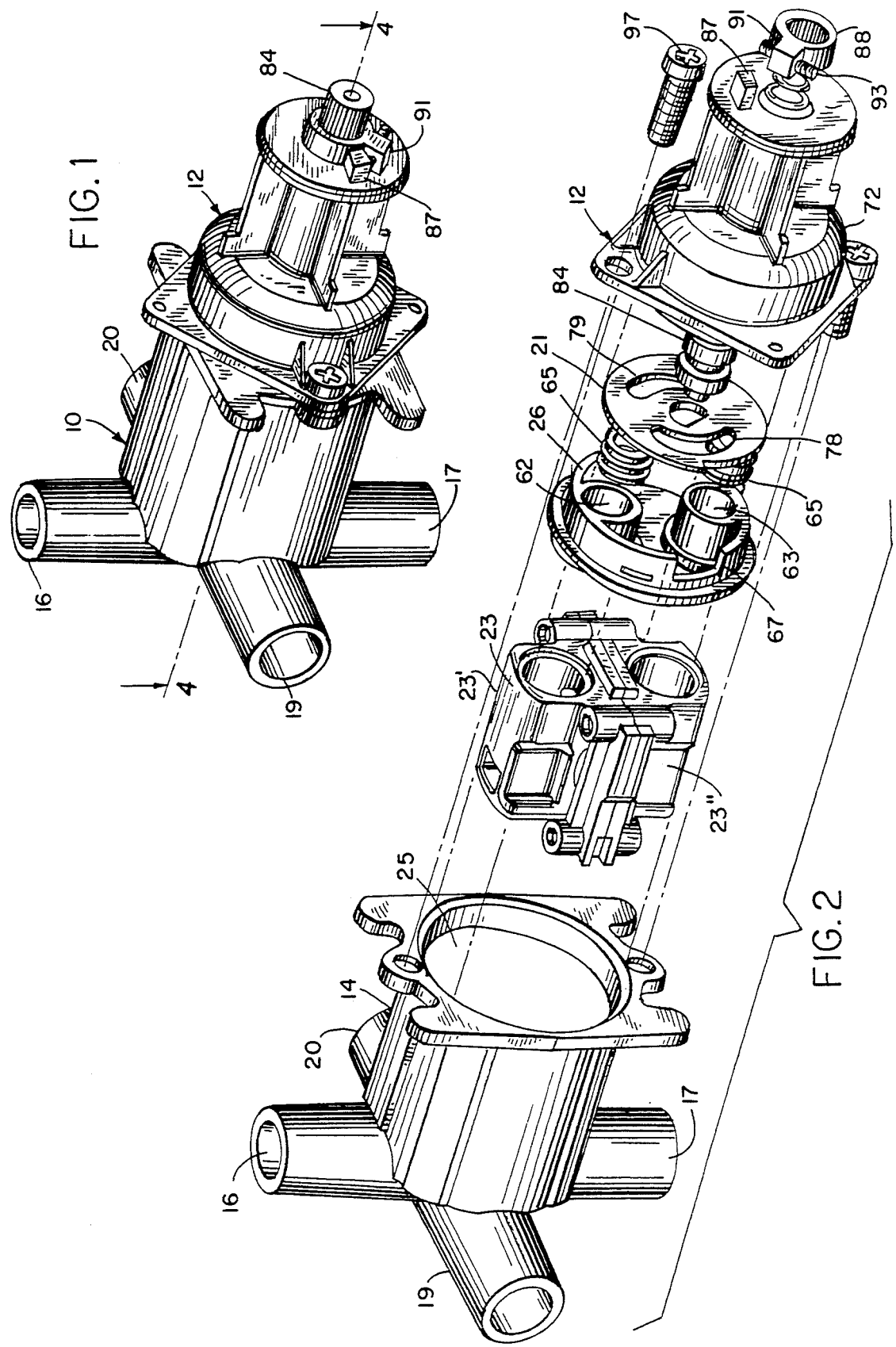

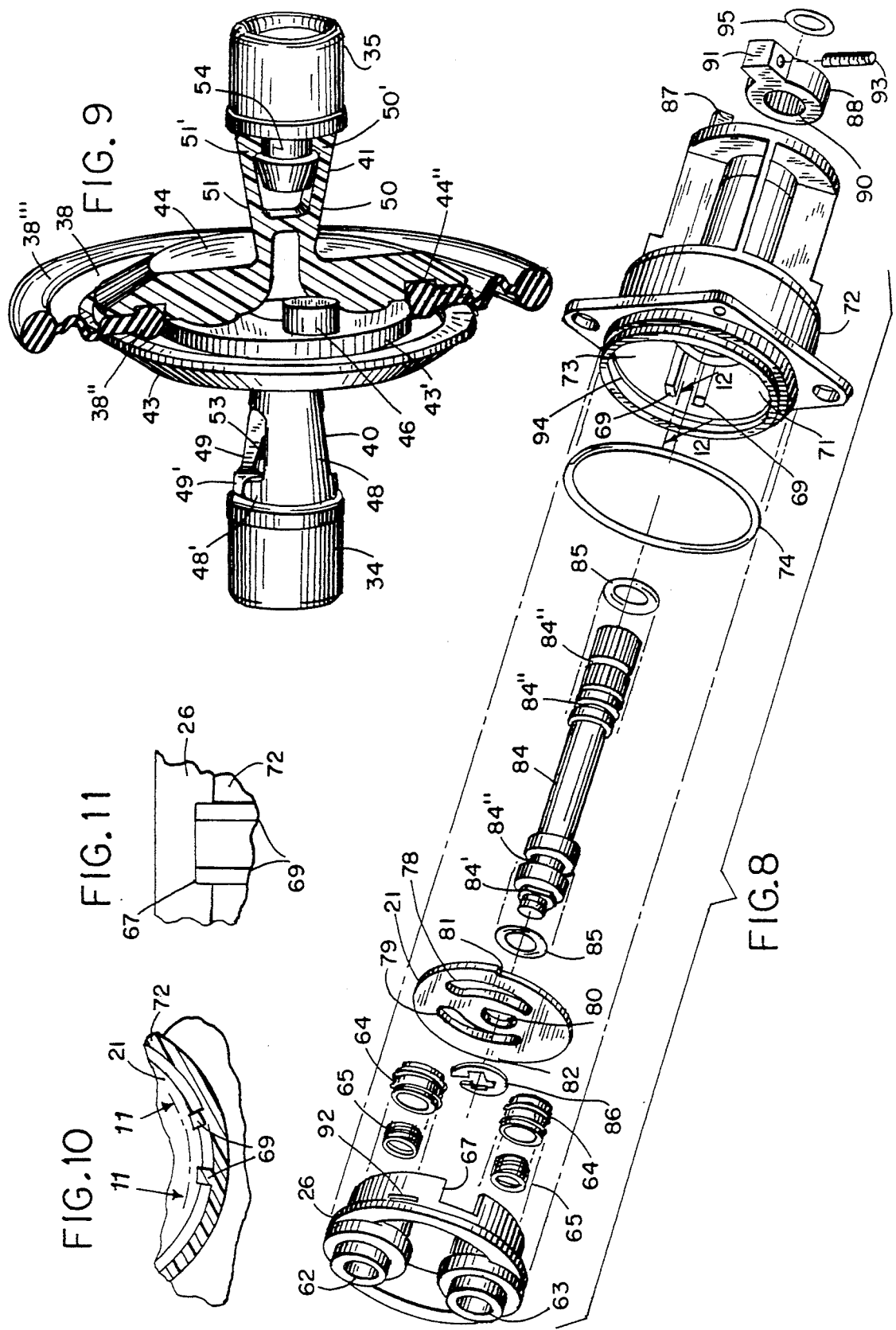

MIXING VALVE

BACKGROUND OF THE INVENTION

A. Field of the Invention

This invention relates primarily to valves which control the mix of hot and cold water. More particularly, the invention relates to valves of the foregoing type wherein the mixture of hot and cold water has pressure-compensation capability.

B. Description of the Art

It is known in the art to provide pressure-compensated valves having separate upper and lower housings, a separate water pressure-balancing cartridge, and a rotatable disk for sliding over spring loaded water inlet seals. With such valves, it becomes necessary sometimes to replace wearable inlet seals. In most instances, these are located inside a pressure-balancing cartridge. For example, see elements 71 and 72 in U.S. Pat. No. 3,921,659 and 75-78 in U.S. Pat. No. 4,095,610. Thus when replacement is required, it is necessary to either discard the entire cartridge or attempt to remove the worn seals and replace them.

One particularly troubling problem with respect to pressure-compensated valves relates to the reciprocating pistons which act in conjunction with a pressure-activated diaphragm. These pistons are designed to reciprocate in close fitting bores. This arrangement necessitates very tight bore alignment and positioning of the pistons in a perpendicular manner with respect to the bore in order to prevent the pistons from binding. For efficient operation, the pistons must be free to move in a reciprocating manner in response to pressure differences in order to effect a near constant mix ratio of water in the inlet passages. Diaphragm activated pistons of the foregoing type are shown in U.S. Pat. Nos. 3,724,480; 3,921,659; and 4,095,610. This requires the use of unduly expensive manufacturing processes and/or extensive quality control to avoid problems due to tolerance differences. It is also desired to simplify the procedures and costs to assemble such valves.

Thus, it can be seen that a need exists for an improved pressure-compensated mixing valve.

SUMMARY OF THE INVENTION

In one aspect, the invention provides a valve body having an axial bore and an open lower end extending from the bore, the valve body having an engagement means extending radially inward into the bore. A rotatable valve element is positioned in the axial bore to control flow of a fluid through the valve, the valve element having a radially outward projecting member. A nonrotatable ported member is positioned in the axial bore having at least two axially extending holes therethrough. The engagement means assists in aligning the ported member in the open lower end of the valve body, and also provides a stop surface for contact with the projection member of the rotatable valve element.

In a preferred form, the engagement means is defined by two spaced feet projections extending from the valve body, and there is a snap fitment means provided between the ported member and the valve body to retain the ported member in the open lower end of the axial bore of the valve body.

In another aspect, the rotatable valve element is connected to a valve stem in the axial bore by a clip member, and an external stop member is connected to the valve stem by a ring member in a groove.

In another preferred form, there is a pressure-compensated mixing valve of the type having a housing defining an inlet chamber, hot and cold inlet passages leading to the inlet chamber, diaphragm means that extends across the inlet chamber between the inlet passages to divide the inlet chamber into hot and cold sections and that is movable toward and away from the inlet passages in response to pressure differentials in the sections, compensating valve means connected to the diaphragm and operable to control flow through the inlet passages in response to movement of the diaphragm, hot and cold outlets leading respectively from the hot and cold sections, and mixing valve means operable to control flow from the outlets. The compensating valve means has piston head valve members operatively positioned in the inlet passages to control flow from the hot and cold inlet passages. There are connecting members attached to the diaphragm at one end and to the piston members at another end by a self-aligning connection that permits the piston head valve members to flex relative to an axis perpendicular to the diaphragm.

In a preferred manner, connecting members include flexible finger portions gripping the piston members.

In yet another preferred form, there is a pressure-compensated mixing valve of the foregoing type which includes both the self-aligning and flexible connection of the piston members and the engagement means for the nonrotatable ported member which also provides an alignment in the valve body and a stop surface for the rotatable valve element.

The objects of the invention therefore include:

a. providing a valve of the above kind which is easily assembled and disassembled for maintenance purposes;

b. providing a valve of the above kind which avoids problems due to manufacturing tolerances in the pressure-compensating assembly;

c. providing a valve of the above kind wherein an internal stop feature also affords a connecting feature; and d. providing a valve of the above kind which affords ease of replacement parts.

These and still other objects and advantages of the invention will be apparent from the description which follows. In the detailed description below, the preferred embodiments of the invention will be described in reference to the accompanying drawings. These embodiments do not represent the full scope of the invention.

BRIEF DESCRIPTION OF THE DRAWINGS

FIG. 1 is a perspective view showing a pressure-compensated mixing valve (in assembled form) constituting a preferred embodiment of the invention;

FIG. 2 is an exploded perspective view of the valve assembly parts shown in FIG. 1;

FIG. 8 is another exploded perspective view of the parts composing the upper portion of the valve assembly;

FIG. 9 is an enlarged perspective view of the pressure-compensating diaphragm and pistons;

FIG. 10 is an enlarged partial detailed view illustrating retention feet of the present invention and internal stop surfaces of the valve body;

FIG. 11 is a sectional view taken along line 11—11 of FIG. 10; and

DESCRIPTION OF THE PREFERRED EMBODIMENTS

Figure 3:
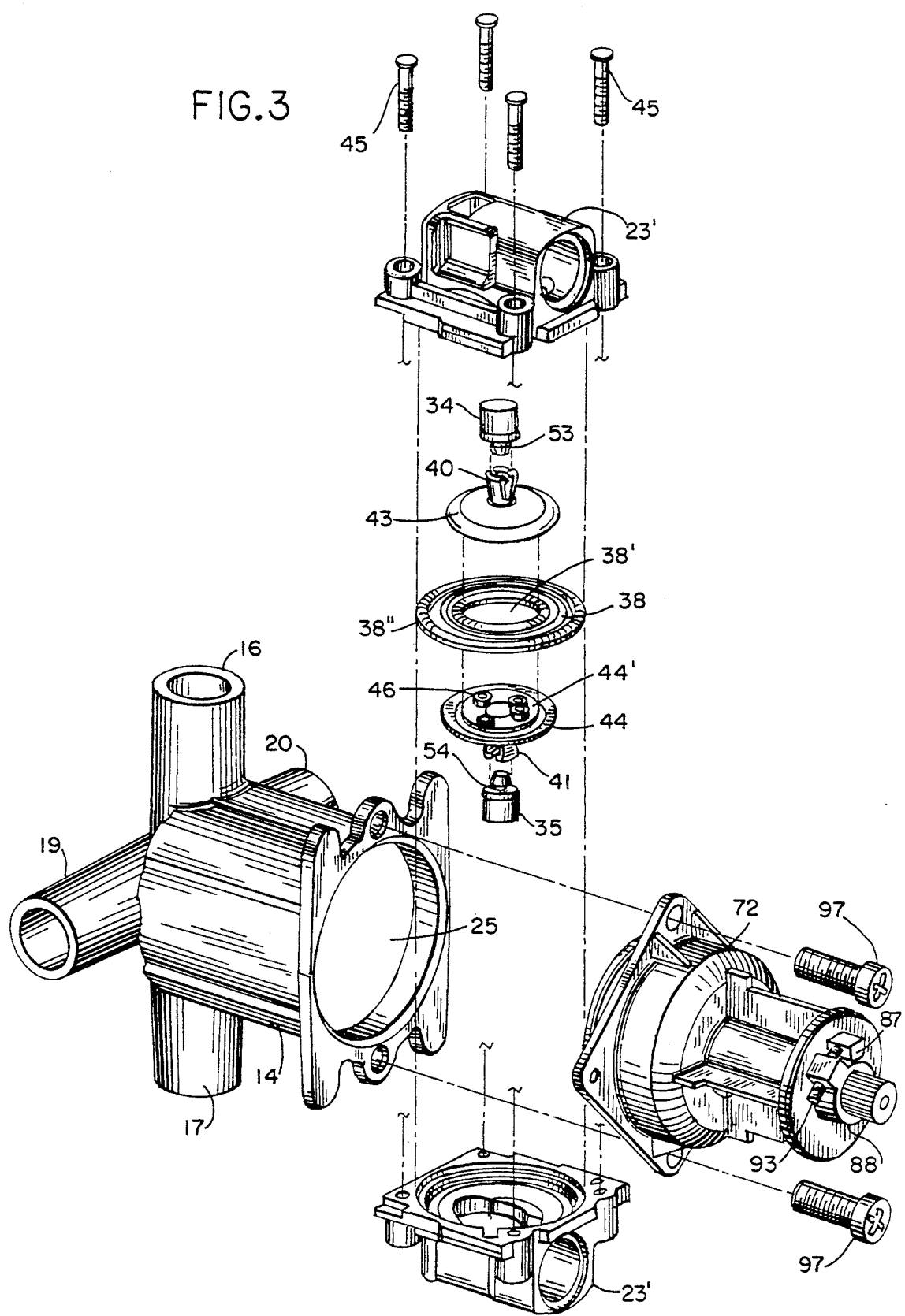
FIG. 3 is an exploded perspective view of the pressure-compensating subassembly of FIG. 2.

Referring specifically to FIGS. 1 and 2, the pressure-compensated mixing valve, generally 10, includes an upper portion or mixing valve, generally 12, in conjunction with valve housing 14 which has hot and cold inlet passages 16 and 17. The housing also has two outlets 19 and 20 and a chamber 25 for receiving a pressure-balancing cartridge 23. Mixing valve 12 has a ported ring 26 and the rotatable valve element or sealing disk 21 for acting in conjunction with the pressure-balancing cartridge 23 as is later explained.

Figure 4:
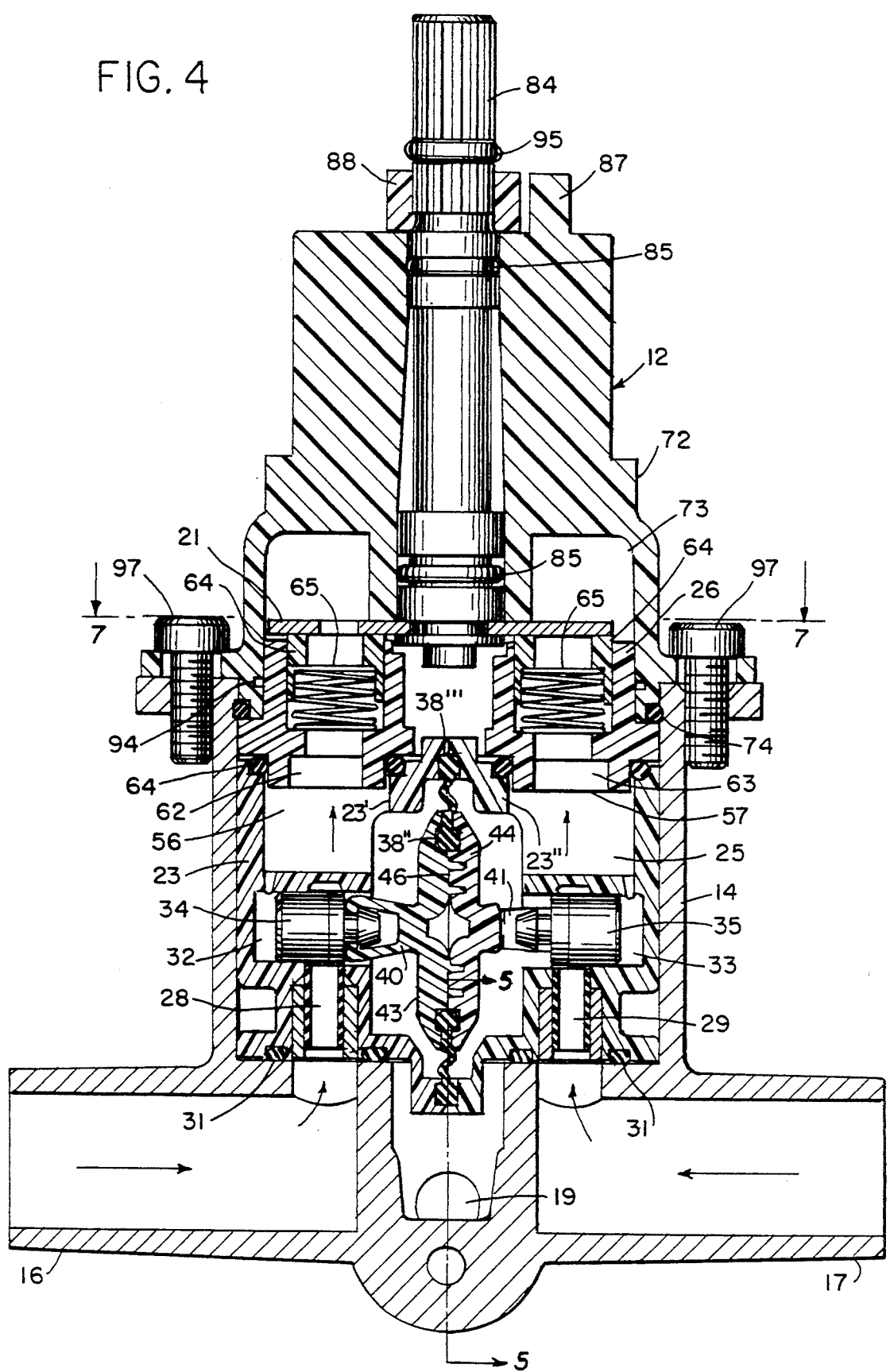
FIG. 4 is an enlarged sectional view taken along line 4—4 of FIG. 1.
Figure 5:
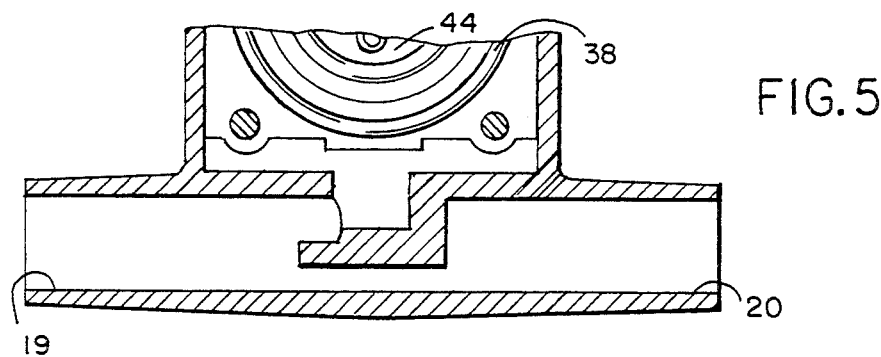
FIG. 5 is a sectional view taken along line 5—5 of FIG. 4.

As seen in FIG. 4, the direction arrows illustrate the pathway of water through the housing 14, as well as the mixing valve 12. Hot and cold water will enter through the inlets 16 and 17, pass upwardly through the inlet passages 28 and 29, through the pressure-compensating cartridge 23, upwardly through the mixing valve 12 and downwardly therefrom along the outside of the cartridge 23 and the inside of housing 14 and subsequently to the outlets 19 and 20. The water pathway to the outlets is best seen in FIG. 5.

Cartridge 23 has the inlet passages 28 and 29 in sealing engagement with the hot and cold inlets 16 and 17 by means of the O-rings 31. There are cross-passages 32 and 33 in cartridge 23 which communicate with the inlet passages 28 and 29. Piston head valve members 34 and 35 are reciprocally mounted in the cross-passages 32 and 33.

The pistons 34 and 35 are connected to the flexible rubber diaphragm 38 through two plastic balance stems 40 and 41. This is best seen in FIGS. 3 and 9. Each balance stem 40 and 41 has hub portions 43 and 44, as well as center portions 43' and 44' for extending through and interconnecting through the central opening 38' of the diaphragm 38. Interlocking feet portions 46 are provided for this purpose. The hub portions 43 and 44 have cutouts such as 44'' to accommodate inner bead 38'' of diaphragm 38. Balance stems 40 and 41 are composed of respective finger portions 48, 49 and 50, 51 which extend from the respective hub portions 43 and 44. Finger portions 48–51 have respective inwardly extending tip portions 48', 49', and 50', 51' for a snap-fit seating in grooves 53 and 54 of the respective pistons 34 and 35.

As shown in FIG. 4, the flexible diaphragm 38 is captured between opposing housing sections 23' and 23'' of cartridge 23 by means of the outer circumferentially extending bead portion 38'''. Referring to FIG. 3, screws 45 afford the connection of the housing sections 23' and 23''.

The diaphragm 38 and the pistons 34 and 35 control the flow of hot and cold water into the chamber 27 of the pressure-compensating cartridge 23 in the usual manner as described in U.S. Pat. No. 3,724,480 which teachings are incorporated herein by reference. With a brief explanation, if the pressure on the hot water should increase, this would move the diaphragm 38 to the right as viewed in FIG. 4 causing the piston 34 to cover more of the inlet passage 28 and uncover the inlet passage 29, thus decreasing the flow of hot water and increasing that of the cold. In a similar manner, an increase on the cold water pressure side would act in the reverse manner. Hot and cold modulated water passes from the cross-passages 32 and 33 and from the divided chamber 25 to the outlet ports 56 and 57 which are aligned with the inlet ports 62 and 63, respectively, of ported ring 26 of the mixing valve 12 which is also shown in FIG. 8.

The ported ring 26 is composed of a plastic material and has ports 62 and 63 sealingly engaged with the cartridge 23 by means of the seals 64. Seals 64 are housed in inlet ports 62 and 63 and are biased against sealing disk 21 by the springs 65. Ported ring 26 has a slot 67 for orientation with feet or projections 69 extending from wall 71 which provides an axial bore 73 of the plastic valve body 72. This is seen in FIG. 8 with a 180 degree rotation of the ring 26 as well as in FIGS. 10 and 11 and provides for orientation of the ported ring 26 with the valve body 72, as well as the previously described orientation of ports 56, 57 and 62, 63. An O-ring 74 affords appropriate sealing engagement between ring 26 and valve body 72. Referring to FIG. 8, the sealing disk 21 is connected to valve stem 84 by passing through opening 80 and engaging surface 84'. A retaining clip 86 affords retention in the usual manner.

Figure 7:
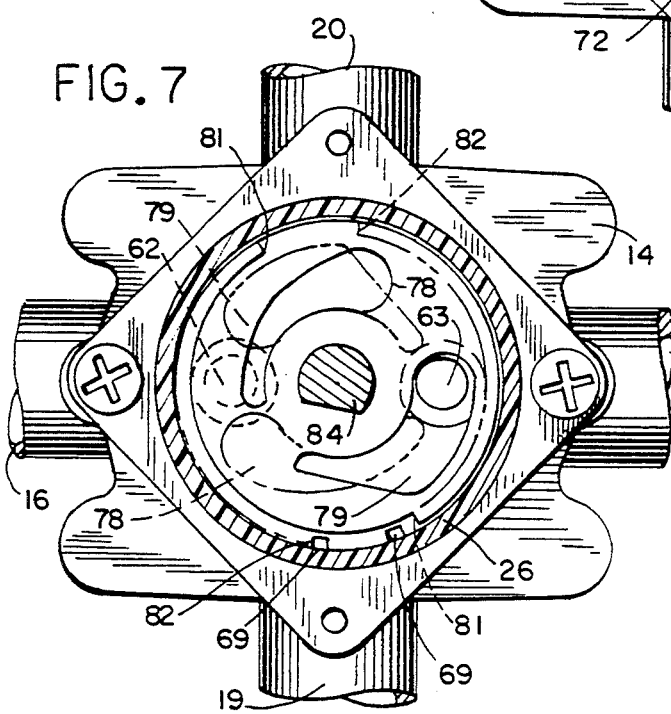
FIG. 7 is a view taken along line 7—7 of FIG. 4.

The sealing disk 21 has orifices 78 and 79 of different geometric configurations for regulating the flow of water through the inlet ports 62 and 63. The different geometric configurations effect a linear relationship between handle rotation and outlet temperature. Stop surfaces or projection members 81 and 82 are disposed on the outer edges of the sealing disk 26 and act in conjunction with the flexible feet 69 to limit rotation of the sealing disk. This is also seen in FIG. 7.

Figure 6:
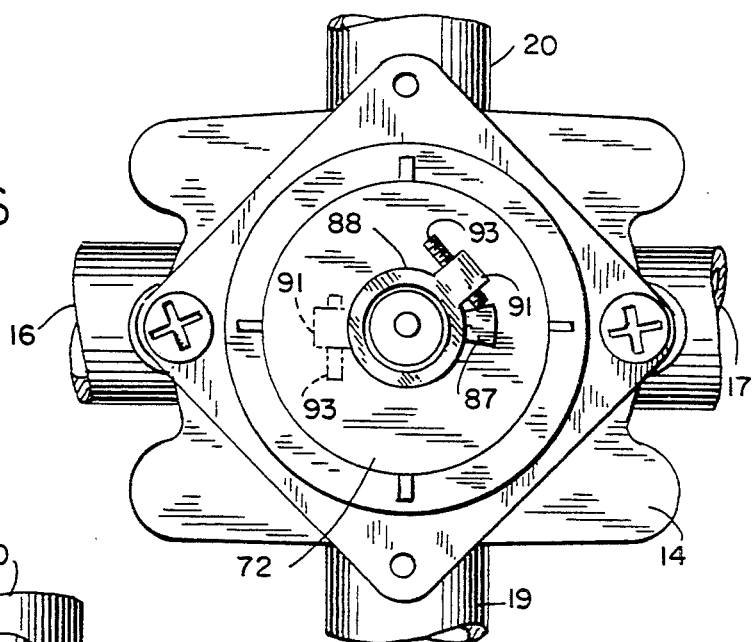
FIG. 6 is a top plan view of the mixing valve assembly with an alternative valve stem position shown in dotted lines.

As shown in FIGS. 6 and 8, an external stop member 87 extends from the top of the valve body 72. It acts in conjunction with the stop adjust collar 88 having the adjustment screw 93 connected to the arm 91 for contact with the stop member 87. As illustrated in FIG. 8, a knurled opening 90 provides connection to the valve stem 84. An O-ring 95 is positioned in groove 84'' on the valve stem 84 to provide retention of the stop adjust collar 88, which affords a fine adjustment flow control by further limiting rotation of the sealing disk 26. Additional seals 85 are disposed between the stem 84 and the valve body 72 in grooves 84''', as well as between valve body 72 and cartridge housing 14 as shown at 74 in FIG. 4. Screws 97 make the usual connection between valve body 72 and housing 14.

Figure 12:
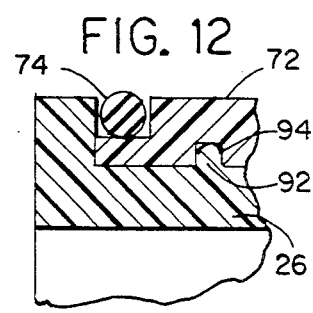
FIG. 12 is a sectional view taken along line 12—12 of FIG. 8 but rotated 90° with the ported member in place.

FIG. 12, as well as FIG. 8, illustrates the snap-together feature of the plastic ported ring 26 and the plastic valve body 72. This is effected by the circumferentially spaced ribs, such as shown at 92, for frictional and resilient engagement in the circumferential groove 94 in the valve body 72.

One important feature of this invention is the ported ring 26 with the inlet ports 62 and 63. As stated earlier, it is frictionally retained in the valve body 72. The ring can be easily assembled because of this frictional fitment. When the seals 66 become worn, they can be easily replaced with a new set in another ported ring.

This obviates having to handle the seals and springs which because of their size can be a problem.

In addition, the feet 69 not only provide for orientation of the ported ring 60 in the valve body 72, but at the same time afford an internal stop means acting in conjunction with the stop surfaces 81 and 82 of the sealing disk 26.

Another important feature of the invention is the self-aligning or loose connection of the pistons 34 and 35 to the diaphragm 38 through the flexible legs 48–51. In the prior art connections of the pistons to the diaphragm, this has been done in a rigid one-piece type connection where the pistons and the alignment stems are one piece or are screw threaded together. As the piston ends travel in close fitting bores, this arrangement necessitates a tight bore alignment and perpendicularity to prevent the pistons from binding. During operation, the pistons must be free to move from side to side in response to pressure differences. The flexible leg connection of the present invention with a snap fit connection allows the pistons 34 and 35 to fit loosely on the balance stems 40 and 41, thereby allowing them to self-align with the pressure-balance bores 32 and 33. The perpendicular relationship of the pistons and the bores, as well as the alignment therein, is made less critical.

It will therefore be appreciated that a pressure-balancing effect can be accomplished without requiring close attention to tolerances or fitment of the pistons 34 and 35 in their respective passageways. Further cost savings is effected in that in place of the usual metallic elongated stems for connection with the diaphragm, plastic balance stems 40 and 41 with legs 48–51 are used instead.

Still another feature of the invention, and as previously indicated, is the replaceable ported ring 26 with the spring loaded seals 66. This affords a manufacturing advantage in that the ring member can be quickly snap fitted onto the valve housing. Further manufacturing efficiencies are effected in that the orientation feet 69 for the ported ring 26 also serve as internal stop members for the sealing disk 21. Also, ease of assembly is facilitated with the use of a clip 86 and an O-ring 95 for retaining disk 21 and stop adjust collar 88.

Yet another feature is in the maintenance of the valve wherein seals 66 can be easily and quickly replaced by replacing the ported ring 60.

Thus, the invention provides an improved mixing valve. While the preferred embodiments have been described above, it should be readily apparent to those skilled in the art that a number of modifications and changes may be made without departing from the spirit and scope of the invention. For example, while the ported ring feature and the self-alignment piston feature have been shown together in the same pressure-compensated mixing valve, it is obvious that they can be employed separately. Accordingly, the ported ring feature could be used in a valve wherein there is no pressure-balancing. Conversely, the pressure-balancing afforded by the flexible connection of the pistons 34 and 35 can be utilized in a mixing valve without the ported ring feature of the valve. Further, while a plumbing valve has been shown, the valve can be used with other types of fluid valves. Also, the specific materials mentioned are not the only ones which can be used. All such and other modifications within the spirit of the invention are meant to be within the scope of the invention.

We claim:

1. A pressure-compensated mixing valve of the type having a housing defining an inlet chamber, hot and cold inlet passages leading to the inlet chamber, diaphragm means that extends across the inlet chamber between the inlet passages to divide the inlet chamber into hot and cold sections, and that is movable toward and away from the inlet passages in response to pressure differentials in the sections, compensating valve means connected to the diaphragm and operable to control flow through the inlet passages in response to movement of the diaphragm, hot and cold outlets leading respectively from the hot and cold sections, and mixing valve means operable to control flow from the outlets, the improvement comprising:

the compensating valve means has piston head valve members operatively positioned in the inlet passages to control flow from the hot and cold inlet passages and connecting members attached to the diaphragm at one end and to the piston head valve members at another end by a self-aligning connection that permits the piston head valve members to flex relative to an axis perpendicular to the diaphragm.

2. The valve of claim 1, wherein the connecting members include flexible finger portions gripping the piston members.

3. The valve of claim 2, wherein the piston members have a groove and the flexible finger portions have tips for seating in the groove.

4. The valve of claim 1, wherein the connecting members include enlarged engaging hub portions for sandwiching the diaphragm therebetween.

5. The valve of claim 1, wherein the mixing valve means also comprises:

a valve body having an axial bore and an open lower end extending from the bore, the valve body having engagement means extending radially inward into the bore;

a rotatable valve element positioned in the axial bore to control flow of a fluid through the valve, the valve element having a radially outward projecting member; and a nonrotatable ported member in the axial bore having at least two axially extending holes therethrough;

whereby the engagement means assists in aligning the ported member in the open lower end of the valve body and also provides a stop surface for contact with the projection member of the rotatable valve element.

* * * * *